(12) United States Patent
Söderberg et al.

(10) Patent No.: US 8,316,806 B2
(45) Date of Patent: Nov. 27, 2012

(54) ARRANGEMENT FOR COOLING OF OIL IN A GEARBOX FOR A VEHICLE

(75) Inventors: Erik Söderberg, Stockholm (SE); Zoltan Kardos, Södertälje (SE)

(73) Assignee: Scania CV AB (Publ) (SE)

( * ) Notice: Subject to any disclaimer, the term of this patent is extended or adjusted under 35 U.S.C. 154(b) by 442 days.

(21) Appl. No.: 12/681,412

(22) PCT Filed: Sep. 29, 2008

(86) PCT No.: PCT/SE2008/051095
§ 371 (c)(1),
(2), (4) Date: Apr. 2, 2010

(87) PCT Pub. No.: WO2009/045159
PCT Pub. Date: Apr. 9, 2009

(65) Prior Publication Data
US 2010/0218735 A1    Sep. 2, 2010

(30) Foreign Application Priority Data
Oct. 5, 2007 (SE) ...................................... 0702241

(51) Int. Cl.
*F01P 11/08* (2006.01)
(52) U.S. Cl. ............ 123/41.33; 123/41.31; 123/196 AB
(58) Field of Classification Search ............... 123/41.31, 123/41.33, 41.48, 41.49, 41.08, 41.09, 41.1, 123/196 AB; 184/6.21, 6.22
See application file for complete search history.

(56) References Cited

U.S. PATENT DOCUMENTS

| | | | |
|---|---|---|---|
| 5,215,044 A * | 6/1993 | Banzhaf et al. | ............ 123/41.29 |
| 5,678,461 A | 10/1997 | Stine | |
| 6,196,168 B1 | 3/2001 | Eckerskorn et al. | |
| 6,536,381 B2 | 3/2003 | Langervik | |

FOREIGN PATENT DOCUMENTS
WO    WO 2008/041924 A1    4/2008

OTHER PUBLICATIONS

International Search Report dated Nov. 19, 2008, issued in corresponding international application No. PCT/SE2008/051095.

* cited by examiner

*Primary Examiner* — Noah Kamen
*Assistant Examiner* — Hung Q Nguyen
(74) *Attorney, Agent, or Firm* — Ostrolenk Faber LLP

(57) ABSTRACT

An arrangement for cooling oil in a gearbox in a vehicle which is powered by a combustion engine, the arrangement including an oil cooler, an oil system configured to circulate oil between the gearbox and the oil cooler, and a coolant circuit configured and operable to lead coolant to the oil cooler. The coolant circuit includes a radiator element for cooling the coolant and a line to lead the cooled coolant from the radiator element to the oil cooler. The coolant circuit has a flow-regulator to regulate the coolant flow through the radiator element for imparting to the coolant a temperature which makes possible a desired cooling of the oil in the oil cooler.

12 Claims, 3 Drawing Sheets

ARRANGEMENT FOR COOLING OF OIL IN A GEARBOX FOR A VEHICLE

CROSS REFERENCE TO RELATED APPLICATION

The present application is a 35 U.S.C. §§371 national phase conversion of PCT/SE2008/051095, filed Sep. 29, 2008, which claims priority of Swedish Application No. 0702241-1, filed Oct. 5, 2007, the disclosure of which is incorporated by reference herein. The PCT International Application was published in the English language.

BACKGROUND TO THE INVENTION, AND STATE OF THE ART

The present invention relates to an arrangement for cooling of oil in a gearbox in a vehicle via a separate cooling circuit.

The oil in a vehicle's gearbox has to be at a relatively low temperature if the components intended to be lubricated and cooled by the oil are to achieve a long service life. A known way of ensuring that the oil in the gearbox will substantially continuously be at a low enough temperature during operation of the vehicle is to use an air-cooled oil cooler for cooling the oil. However, for it to be able to provide effective cooling of the oil, an air-cooled oil cooler has to be so positioned in the vehicle that air which is at the temperature of the surroundings flows through it. Air-cooled oil coolers are therefore often situated at the front portion of a vehicle at a location in front of, inter alia, the radiator for cooling the coolant of the combustion engine's cooling system. At this location the oil cooler has a forced air flow passing through it which is at the temperature of the surroundings and is provided by a radiator fan during operation of the combustion engine. A disadvantage of such positioning of the oil cooler is that the oil has to be conveyed forward from the gearbox to the front portion of the vehicle. This entails having to provide relatively long oil lines in the vehicle. Moreover, for safety reasons, the presence of oil in such an exposed region as the front portion of a vehicle is to be avoided.

Another known practice is to use a liquid-cooled oil cooler for cooling of oil in a gearbox. Such oil coolers use the existing coolant in the vehicle's ordinary cooling system for cooling the gearbox oil. Coolant-cooled oil coolers may be situated in the vehicle close to the gearbox. In heavy vehicles, the coolant is usually cooled in a radiator situated downstream of a charge air cooler with respect to the intended direction of air flow through these cooling elements. The air is thus warmed by the charge air cooler before it can be used for cooling the coolant in the radiator. This means that coolant is cooled by air which is at a higher temperature than the surroundings. The coolant can therefore not usually have a low enough temperature imparted to it for it to be able to cool the oil in the gearbox in an optimum manner.

U.S. Pat. No. 6,196,168 refers to a system for warming and cooling of oil in a coolant/oil heat exchanger in a vehicle. The oil which is warmed and cooled in the heat exchanger may be gearbox oil. A valve is used for controlling the supply of coolant to the heat exchanger. After starting of the vehicle, the valve leads uncooled coolant to the heat exchanger from a tank. The oil provides in this case a warming of the coolant. In operating situations where the coolant is warm but at below normal operating temperature, the valve leads a mixture of coolant from a low-temperature cooler and said tank to the heat exchanger to cool/warm the oil. During normal operation of the vehicle when the coolant has reached operating temperature, only coolant from the low-temperature cooler is used for cooling the oil. Even if the coolant which has been cooled in a low-temperature cooler is at a lower temperature than the coolant cooled in an ordinary radiator, the coolant is usually still too warm to cool the gearbox oil to an optimum temperature during operation of a vehicle.

SUMMARY OF THE INVENTION

The object of the present invention is to provide an arrangement which makes it possible for the oil in a gearbox in a vehicle to be cooled to a temperature such that the components of the gearbox will achieve a substantially optimum service life.

This object is achieved with an arrangement for cooling oil in the gearbox of a vehicle via a cooling circuit arrangement that brings a coolant to the oil used in the gearbox for cooling the oil, according to the invention. The oil and the components in a gearbox usually have optimum characteristics when they are at a relatively low temperature. Keeping the oil and the components in a gearbox substantially continuously at such a temperature during operation of a vehicle involves the oil having to be cooled by coolant which is at a lower temperature than the desired temperature of the oil and of the components. The coolant in the combustion engine's cooling system is normally at too high a temperature to be able to cool the oil in the gearbox to the desired temperature. According to the invention, a coolant circuit with a circulating coolant which is cooled in a radiator element which has a cooling air flow passing through it is therefore used. The more slowly the coolant is led through the radiator element, the longer the time during which it is cooled by the air flowing through the radiator element. Regulating the coolant flow through the radiator element in a suitable manner makes it possible for the coolant to be substantially always at a low enough temperature when it leaves the radiator element for it to be able to cool the oil in the oil cooler in a desired manner. With such cooling of the oil, the components of the gearbox can substantially always be provided with good lubrication and cooling. The components may thus achieve an optimum service life.

According to an embodiment of the present invention, said flow-regulating means are adapted to regulating the flow through the radiator element steplessly. The temperature of the coolant and the temperature of the oil in the gearbox can thus be regulated with good precision. Said flow-regulating means comprise with advantage an adjustable throttle valve. A coolant pump may for example maintain a base flow of coolant through the radiator element. The throttle valve may thereafter be used for steplessly reducing the base flow through the radiator element to a desired flow level. Said flow-regulating means preferably comprise a control unit adapted to controlling the throttle valve. The control unit may be a computer unit comprising suitable software for controlling the throttle valve in an optimum manner. The control unit may receive information concerning, for example, the temperature of the oil in the gearbox and regulate on the basis inter alia of that information the throttle valve and the flow of coolant through the radiator element. Alternatively, said flow-regulating means may comprise a coolant pump adapted to providing a variable coolant flow through the radiator element. The coolant flow through the radiator element may be varied by varying the speed of the coolant pump. A control unit of the kind indicated above controls with advantage such a coolant pump as well.

According to another embodiment, the oil cooler is a counterflow heat exchanger. The coolant and the oil are led in opposite directions through the oil cooler which takes the form of a counterflow heat exchanger. The oil is thus led out from the oil cooler where the cold coolant is led into the oil cooler. This makes it possible to cool the oil to a temperature close to the temperature of the cold coolant.

According to another embodiment of the invention, the coolant circuit takes the form of a separate cooling system with a separately circulating coolant adapted to cooling the oil in the oil cooler. Such a separate coolant circuit comprises with advantage a coolant pump of its own for circulating the coolant between the oil cooler and the radiator element. In such cases, the speed of the coolant pump can be regulated to vary the coolant flow through the radiator element. Alternatively, the coolant pump may be run at a substantially constant speed, with a throttle valve or similar component regulating the coolant flow through the radiator element. With such a separate coolant circuit there is no need to make any changes to the ordinary cooling system. In situations where the combustion engine's cooling system cannot fully perform its function, the arrangement may divert priority away from cooling the oil in the gearbox and provide a maximum coolant flow through the radiator element. The amount of cold coolant produced in the radiator element may thereafter be used for cooling the warm coolant in the combustion engine's cooling system in a suitably situated heat exchanger. In this case the radiator element of the coolant circuit is used as an extra radiator for cooling the coolant of the combustion engine's cooling system.

According to another embodiment of the present invention, the coolant circuit is connected to the combustion engine's cooling system. In this case the same coolant is thus used both in the combustion engine's cooling system and in the coolant circuit for cooling the oil in the oil cooler. To this end, the coolant circuit may comprise a line intended to receive coolant from the combustion engine's cooling system at a location situated downstream of a radiator which is adapted to cooling the coolant of the cooling system and upstream of the combustion engine with respect to the direction of coolant flow in the cooling system. The coolant received in the coolant circuit will thus have just been cooled in the vehicle's ordinary radiator and will not yet have been used for cooling the combustion engine. The coolant is therefore taken from a region of the cooling system in which it is normally at its lowest temperature. This coolant undergoes a further step of cooling in the radiator element of the coolant circuit before it is used for cooling the oil in the oil cooler. The coolant circuit may also comprise a line intended to lead coolant from the oil cooler to the cooling system at a location situated downstream of the combustion engine and upstream of a thermostat with respect to the direction of coolant flow in the cooling system. When the coolant has been used for cooling the oil in the oil cooler, it is led back to the combustion engine's cooling system via said line, in which it is mixed with warm coolant from the combustion engine. The coolant is thereafter led via the thermostat to the ordinary radiator in order to be cooled. As the coolant circuit uses the same coolant as the combustion engine's cooling system, it is also possible to use said coolant circuit for cooling the coolant in operating situations where the combustion engine's cooling system cannot fully perform its function. In such situations, priority is diverted away from cooling the oil in the gearbox, and said flow means lead a maximum flow of the coolant through the radiator element. When a maximum coolant flow is led through the radiator element, the coolant will not be at the same low temperature as when it leaves the radiator element but, on the other hand, a considerably larger amount of cooled coolant is produced, with the result that the total cooling effect in the radiator is optimised. The cold coolant is led to the combustion engine's cooling system via said line in which it is mixed with the warm coolant from the combustion engine. In this case the radiator element of the coolant circuit is thus used as an extra radiator for cooling the coolant in the combustion engine's cooling system.

According to another embodiment of the invention, the arrangement comprises an air passage in the vehicle and said radiator element is arranged at a location in the air passage where it has air at the temperature of the surroundings flowing through it. By suitable reduction of the coolant flow through the radiator element, the coolant can in this case provide cooling to a temperature close to the temperature of the surroundings. The arrangement preferably comprises a radiator fan adapted to providing a forced air flow through the air passage. Good heat transfer may thus be provided between the cooling air flow and the coolant in the radiator element.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
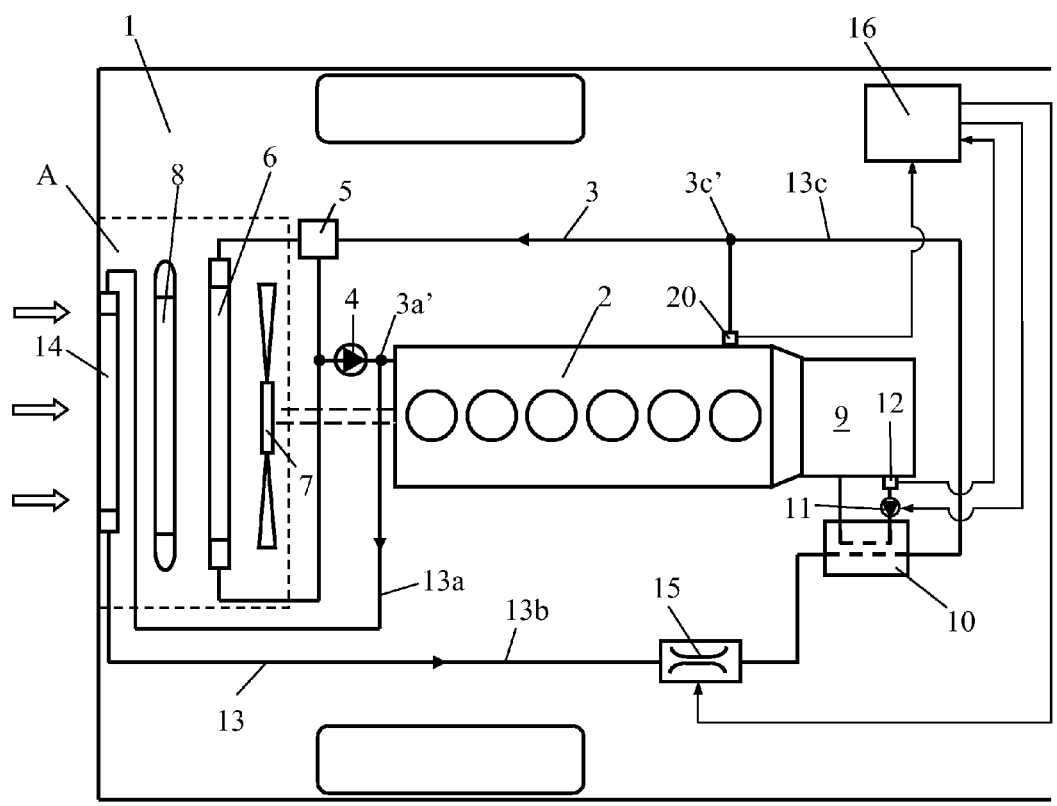
FIG. 1 depicts an arrangement for cooling of oil in a gearbox in a vehicle according to a first embodiment of the invention.

FIG. 1 depicts schematically a vehicle 1 powered by a supercharged combustion engine 2. The vehicle 1 may be a heavy vehicle powered by a supercharged diesel engine. The combustion engine 2 is cooled in a conventional manner by a cooling system 3 which contains a circulating coolant. The coolant is circulated in the cooling system 3 by a coolant pump 4. The cooling system 3 comprises a thermostat 5 adapted to directing the coolant to a radiator 6 or alternatively back to the combustion engine 2 when the temperature of the coolant is below a specific value. The radiator 6 is arranged in an air passage A at a front portion of the vehicle 1. The coolant is cooled in the radiator 6 by the air which flows through the air passage A. A radiator fan 7 is adapted to providing a forced air flow in a specific direction through the air passage A. The radiator fan 7 is driven by the combustion engine 2 via a suitable connection. A charge air cooler 8 is arranged in the air passage A upstream of the radiator 6 with respect to the direction of air flow through the air passage A. The function of the charge air cooler 8 is to cool the compressed air before it is led to the supercharged combustion engine 2.

A gearbox 9 is arranged in a conventional manner beside the combustion engine 2. An oil cooler 10 is fitted in the vehicle close to the gearbox 9 to cool the oil in the gearbox 9. The oil cooler takes the form of a counterflow heat exchanger. The oil of the gearbox 9 is circulated in an oil system between the gearbox 9 and the oil cooler 10 by an oil pump 11. A temperature sensor 12 is arranged in the oil system to detect the temperature of the oil. The cooling of the oil in the oil cooler 10 involves using a coolant circuit 13 connected to the cooling system which cools the combustion engine. The coolant circuit 13 can therefore use the existing coolant of the cooling system 3 to cool also the oil in the oil cooler 10. The coolant circuit 13 comprises a line 13a intended to receive coolant from the cooling system at a location 3a' situated downstream of the coolant pump 4 and upstream of the combustion engine 2 with respect to the direction of coolant flow in the cooling system 3. The coolant pump 4 can thus be used for circulating coolant in the coolant circuit 13. The line 13a is adapted to leading the coolant to a radiator element 14 in the coolant circuit 13. The radiator element 14 is situated in the air passage A upstream of the charge air cooler 8 and the ordinary radiator 6 with respect to the intended direction of air flow through the air passage A. The radiator element 14 will therefore have air at the temperature of the surroundings flowing through it. The coolant circuit 13 comprises a line 13b adapted to leading the cooled coolant from the radiator element 14 to the oil cooler 10. The coolant will thus be at the substantially same temperature when it reaches the oil cooler 10 as it had when it left the radiator element 14. The coolant circuit 13 also comprises a line 13c intended to lead coolant back to the cooling system. The coolant is led back at a location 3c' situated downstream of the combustion engine 2 and upstream of the thermostat 5 with respect to the direction of coolant flow in the cooling system 3. The coolant circuit 13 comprises an adjustable throttle valve 15 which in this case is arranged in the line 13b, although it may also be arranged in either of the lines 13a, c. A control unit 16 is adapted to controlling the throttle valve 15. The control unit 16 may be a computer unit comprising suitable software for the purpose. A temperature sensor 20 is adapted to detecting the temperature of the coolant at a suitable location in the ordinary cooling system. The control unit is adapted to receiving information from the temperature sensor 12 concerning the temperature of the gearbox oil and the temperature sensor 20 concerning the temperature of the coolant.

During operation of the combustion engine 2 the coolant in the cooling system 3 is circulated by the coolant pump 4. The circulating coolant thus provides cooling of the combustion engine 2. The warm coolant from the combustion engine 2 is cooled in the radiator 6 by air caused to flow through the air passage A by the radiator fan 7. Since the air which flows through the radiator 6 has already passed through the radiator element 14 and the charge air cooler 8, it will be at a raised temperature relative to the temperature of the surroundings. Thus the coolant in the radiator 6 can at best be cooled to a temperature corresponding to that raised temperature. To cool the combustion engine 2 it is often sufficient for the coolant to be cooled by air which is at such a raised temperature. The coolant circuit 13 which is adapted to cooling the oil of the gearbox 9 receives part of the coolant at a location 3a' in the cooling system after it has been cooled in the radiator 6. This portion of the coolant is led via the line 13a to the radiator element 14 situated far forward in the air passage A. The coolant undergoes here a second step of cooling by air which is at the temperature of the surroundings. In optimum circumstances, the coolant which circulates through the radiator element 14 can thus be cooled to a temperature close to the temperature of the surroundings. The temperature of the coolant when it leaves the radiator element 14 depends, however, on a number of parameters such as the temperature of the coolant at the inlet to the radiator element 14, the capacity of the radiator element 14, the temperature and velocity of the cooling air flow through the radiator element 14, and on the coolant flow through the radiator element 14.

The coolant flow through the radiator element 14 is a parameter adapted to being controlled by the throttle valve 15 and the control unit 16. The coolant flow through the radiator element 14 can be varied by regulating the throttle valve 15. The coolant may thus be cooled to varying temperatures when it leaves the radiator element 14. If the coolant flow is reduced sufficiently, the coolant may be cooled to substantially the temperature of the surroundings. As the oil cooler is a counterflow heat exchanger, it is also possible to cool the oil in the oil cooler 10 to the temperature of the coolant and hence to a temperature substantially corresponding to the temperature of the surroundings. With suitable throttling of the flow in the line 13b, the oil in the gearbox 9 can in most operating ranges of the combustion engine 2 be cooled to a desired low temperature. The oil in the gearbox 9 may therefore continuously maintain such a low temperature that components in the gearbox 9 are provided with very good lubrication and cooling. The components of the gearbox may thus achieve a substantially optimum service life. The control unit 16 is also adapted to controlling the oil pump 11 in the oil circuit and to receiving information from the temperature sensor 12 concerning the temperature of the oil in the gearbox 9. The control unit may thus only begin to circulate oil through the oil cooler 10 when the oil in the gearbox has reached a predetermined temperature. The oil in the gearbox 9 can thus be provided with a substantially constant temperature during operation of the vehicle 1. When the coolant has cooled the oil in the oil cooler 10, it is led via the line 13c back to the cooling system at the location 3c'. The coolant which has cooled the oil in the oil cooler 10 is thus mixed with the warm coolant which comes from the combustion engine 2. The coolant is led thereafter to the ordinary radiator 6 in order to be cooled.

The control unit 16 is also adapted to receiving information from a temperature sensor 20 which detects the temperature of the coolant in the ordinary cooling system. In this case the temperature sensor detects the temperature of the coolant after it has cooled the combustion engine 2. The coolant is here at its highest temperature. In situations where the control unit 16 receives information from the temperature sensor 20 which indicates that the ordinary cooling system is under such heavy load that it cannot fully perform its function, the control unit 16 may temporarily divert priority away from cooling the oil in the gearbox 9 and open the throttle valve 15 to the maximum. The control unit 16 will stop the oil pump 11 so that no oil is circulated through the oil cooler 10. Thus a maximum flow of coolant can be led through the radiator element 14. The coolant will certainly not have the same low temperature when it flows at a maximum flow through the radiator element, but the amount of cooled coolant produced means that the cooling effect achieved can be optimised. The coolant is led from the radiator element 14 via the line 13b, the oil cooler 10 and the line 13c to the cooling system at the location 3c' where the cold coolant mixes with the warm coolant which comes from the combustion engine 2. In this case the radiator element 14 of the coolant circuit can thus be used as an extra radiator for cooling the coolant in the combustion engine's cooling system.

Figure 2:
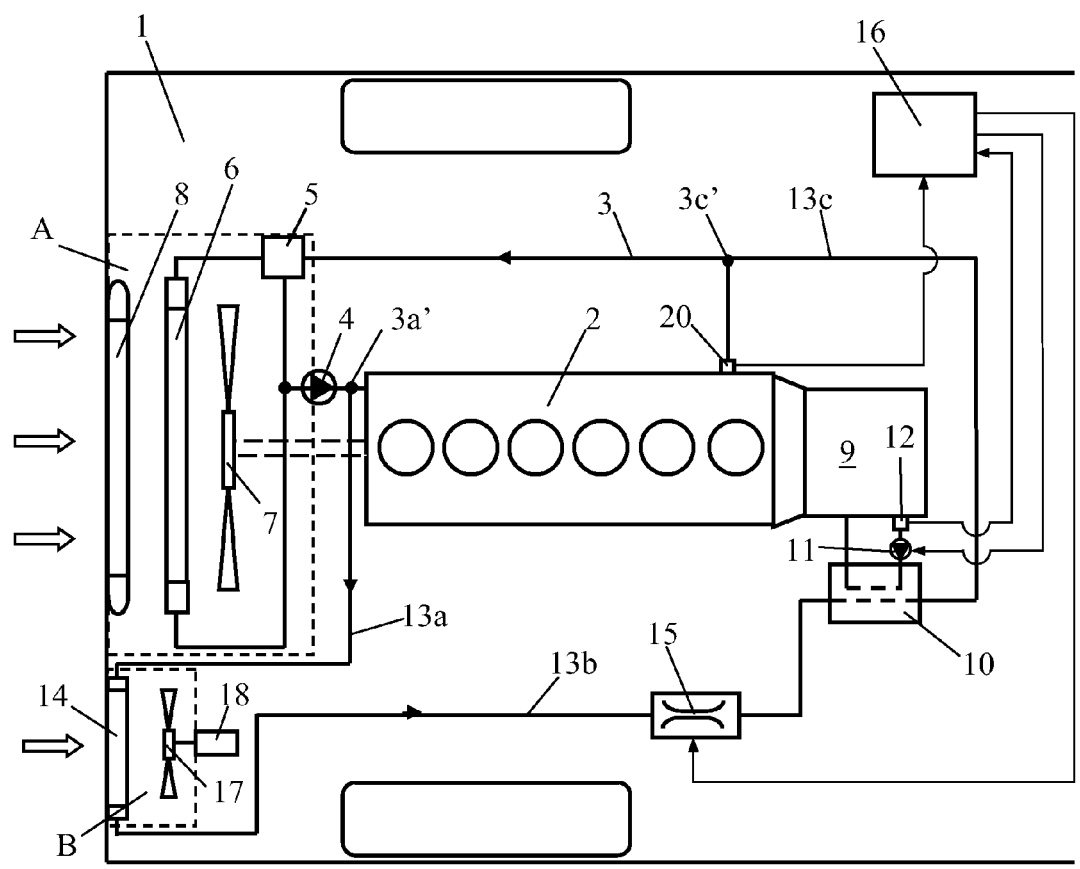
FIG. 2 depicts an arrangement for cooling of oil in a gearbox in a vehicle according to a second embodiment of the invention and FIG. 3 depicts an arrangement for cooling of oil in a gearbox in a vehicle according to a third embodiment of the invention.

FIG. 2 depicts an alternative arrangement for cooling the oil in a gearbox 9 in a vehicle. In this case the radiator element 14 is applied in a separate air passage B in the vehicle 1. A radiator fan 17 here provides a forced air flow through the radiator element 14. The radiator fan 17 is driven by an electric motor 18. Air which flows through the radiator element 14 is here at the temperature of the surroundings, making it possible to cool the coolant in the radiator element 14 to a temperature close to the temperature of the surroundings when a small coolant flow is led through the radiator element 14. In this case the charge air cooler 8 and the ordinary radiator 6 provide more effective cooling than in the embodiment depicted in FIG. 1, since in this case they have a cooling air flow passing through them which has not been warmed by a radiator element 14 situated upstream. The radiator element 14 in the air passage B may therefore be somewhat smaller than in FIG. 1. The arrangement comprises a coolant circuit 13 with components corresponding to FIG. 1. We therefore give no further description of the function of the coolant circuit 13.

Figure 3:
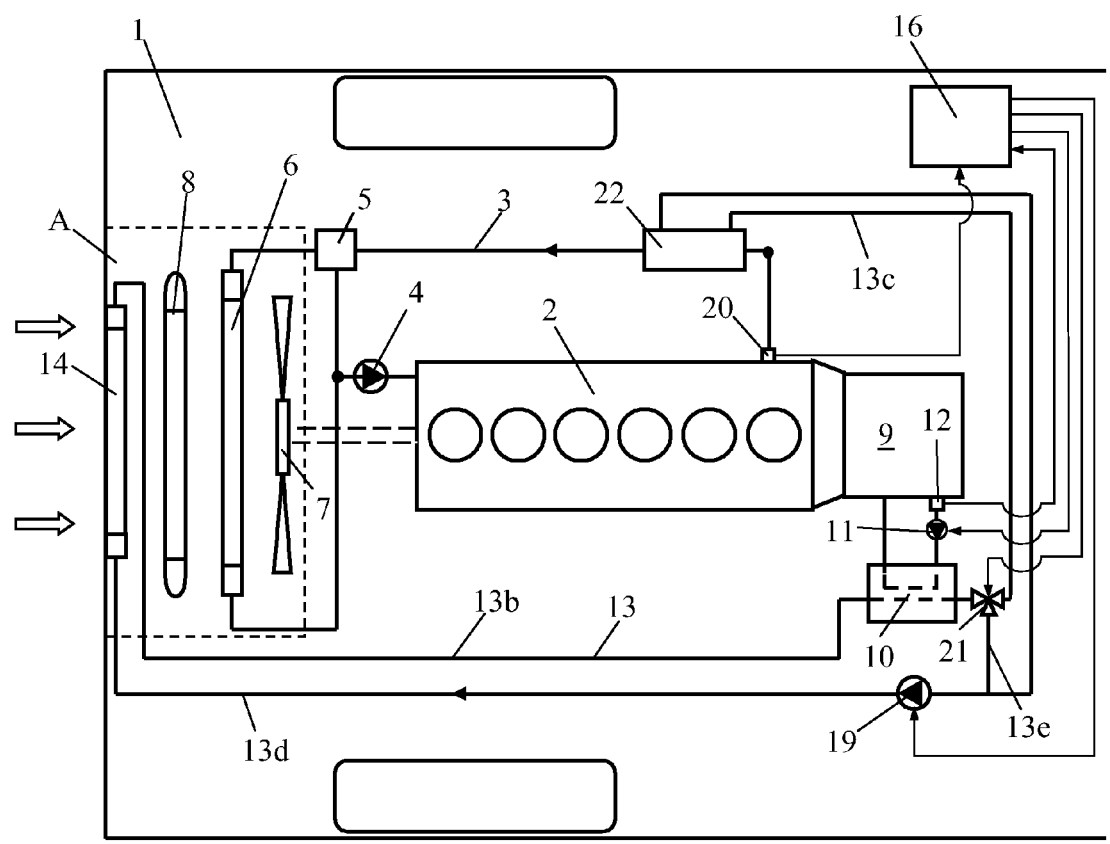

FIG. 3 depicts a further alternative arrangement for cooling the oil in a gearbox 9 in a vehicle. In this case a separate coolant circuit 13 with a coolant circulated by a coolant pump 19 is used. The separate cooling circuit comprises a radiator element 14 situated far forward in an air passage A at a location upstream of a charge air cooler 8 and an ordinary radiator 6 for cooling the coolant of the combustion engine's cooling system. The coolant of the separate cooling circuit 13 undergoes a step of cooling by air which is at the temperature of the surroundings in the radiator element 14. Such cooling of the coolant in the radiator element 14 is usually perfectly sufficient when the coolant is primarily intended to cool the oil in the oil cooler 10. A control unit 16 is here adapted to controlling the coolant pump 19 so that it circulates a desired coolant flow through the radiator element 14 and the coolant circuit 13. The coolant pump 19 is so configured that it can provide a variable coolant flow. When the coolant has passed through the oil cooler 10, it is led to a line 13c. The line 13c comprises a three-way valve 21 connected to a transverse line 13e. The three-way valve 21 is controlled by the control unit 16. The line 13c also comprises a heat exchanger 22 in which heat can be transferred between the coolant in the separate circuit 13 and the coolant in the combustion engine's cooling system.

During operation of the combustion engine 2, the control unit 16 receives information from the temperature sensor 12 concerning the temperature of the oil in the gearbox 9. On the basis of that information, the control unit causes the coolant pump 19 to provide a coolant flow through the radiator element 14 which imparts to the coolant a temperature such as to provide a desired cooling of the oil in the oil cooler 10. When the coolant has cooled the oil in the oil cooler 10, it is directed by the three-way valve 21 to the transverse line 13e, from which it reaches the line 13d. In the line 13d, the coolant is circulated towards the radiator element 14 by the coolant pump 19. If the control unit 16 receives information from the temperature sensor 20 concerning the temperature of the coolant which indicates that the combustion engine's cooling system is overloaded, it activates the coolant pump 19 to circulate a maximum coolant flow through the radiator element 14. The control unit 16 will switch off the oil pump 11 so that no oil is led through the oil cooler 10. The coolant which is cooled in the radiator element 14 may here be led through the oil cooler 10 without being warmed. In this case, the control unit 16 places the three-way valve 21 in a position such that coolant is led on in the line 13c towards the heat exchanger 22. The cold coolant cools in the heat exchanger 22 the warm coolant in the cooling system of the combustion engine 2. The coolant in the separate coolant circuit 13 is thereafter led back to the radiator element 14 via the lines 13c, 13d. In this case too, the radiator element 14 of the coolant circuit may thus be used as an extra radiator for cooling the coolant in the combustion engine's cooling system.

The invention is in no way limited to the embodiments described but may be varied freely within the scopes of the claims.

The invention claimed is:
1. An arrangement for cooling oil in a gearbox in a vehicle wherein the vehicle comprises a combustion engine having a cooling system for cooling the combustion engine, the arrangement comprises an oil cooler, an oil system configured and operable to circulate oil between the gearbox and the oil cooler,
a coolant circuit configured and operable to lead coolant to the oil cooler, the coolant circuit comprises a radiator element configured for cooling the coolant and the radiator element being connected for leading cooled coolant from the radiator element to the oil cooler, the coolant circuit further comprises a flow-regulating device configured for regulating the coolant flow through the radiator element for imparting to the coolant a temperature which causes a desired cooling of the oil in the oil cooler, the arrangement being configured to temporarily divert priority away from cooling the oil in the gearbox and to leading a relatively large coolant flow through the radiator element in selected situations where the load on the combustion engine's cooling system is greater than a selected level, and to lead the coolant from the radiator element which cools the coolant to the combustion engine's cooling system.

2. An arrangement according to claim 1, wherein the flow-regulating device is configured and operable to regulate the coolant flow through the radiator element steplessly.

3. An arrangement according to claim 2, wherein the flow-regulating device comprises an adjustable throttle valve configured to control flow of coolant.

4. An arrangement according to claim 3, wherein the flow-regulating device comprises a control unit configured and operable to control adjustment of the throttle valve.

5. An arrangement according to claim 1, wherein the flow-regulating device comprises a coolant pump configured and operable and connected to provide a variable coolant flow through the radiator element.

6. An arrangement according to claim 1, wherein the oil cooler is configured as a counterflow heat exchanger, with oil to be cooled flowing in one direction and coolant flowing in an opposite direction past each other in the heat exchanger.

7. An arrangement according to claim 1, wherein the coolant circuit comprises a separate cooling system with a separately circulating coolant therein and the separate cooling system being positioned and operable to cool the oil in the oil cooler.

8. An arrangement according to claim 1, wherein the coolant circuit is connected to the combustion engine's cooling system, the cooling circuit being connected to lead coolant from the oil cooler back to the cooling system at a location of the cooling system situated downstream of the combustion engine and also upstream of a thermostat with respect to a direction of coolant flow in the cooling system.

9. An arrangement according to claim 1, further comprising an air passage in the vehicle and the radiator element is situated at a location in the air passage in which air at the temperature of the surroundings flows through the radiator element.

10. An arrangement according to claim 5, wherein the pump is operable and configured to pump a base flow of coolant; and the flow regulating device comprises an adjustable throttle valve configured to control flow of coolant.

11. An arrangement according to claim 8, wherein the thermostat is so configured and connected to lead coolant back to the coolant circuit.

12. An arrangement according to claim 9, wherein the air passage is separate from the engine cooling system.

* * * * *